United States Patent [19]

Gallo et al.

[11] 4,163,386
[45] Aug. 7, 1979

[54] MASS AND FORCE METER

[75] Inventors: Mario Gallo; Johannes Wirth, both of Zurich, Switzerland

[73] Assignee: Wirth, Gallo & Co., Zurich, Switzerland

[21] Appl. No.: 844,467

[22] Filed: Oct. 21, 1977

[30] Foreign Application Priority Data

Sep. 1, 1977 [CH] Switzerland .................. 10642/77

[51] Int. Cl.² .................................................. G01L 1/10
[52] U.S. Cl. .............................. 73/141 R; 73/DIG. 1
[58] Field of Search ......... 73/141 A, 141 R, 517 AV, 73/DIG. 1; 177/210 FP

[56] References Cited

U.S. PATENT DOCUMENTS

| | | | |
|---|---|---|---|
| 2,854,581 | 9/1958 | Scarrott | 73/517 AV |
| 3,098,388 | 7/1963 | Appleton | 73/DIG. 1 |
| 3,423,999 | 1/1969 | Wirth et al. | 73/141 R |

Primary Examiner—James J. Gill
Attorney, Agent, or Firm—Stevens, Davis, Miller & Mosher

[57] ABSTRACT

A mass and force meter with a frame, a load-support and a measuring system, wherein the mass or force to be measured acts indirectly on the tension of two transversally vibrating, pre-loaded strings excited by electronic means, so that the resultant frequency changes serve for calculating the magnitude of said mass or force in a computing device. Both strings, a first transmission element for the transmission of a pre-loading force and a second transmission element for the transmission of a force depending on the load to be measured are fixed to a force distributor. The force distributor is guided in a statically determined way relatively to the frame by means of the two strings, and by means of at least one guide with forming the first transmission element respect to the pre-loading force and to the force depending on the load to be measured, said guide being elastic and under a bending pre-tension and able to transmit moments, so that it generates the pre-load of the strings and transmits it to the force distributor.

4 Claims, 4 Drawing Figures

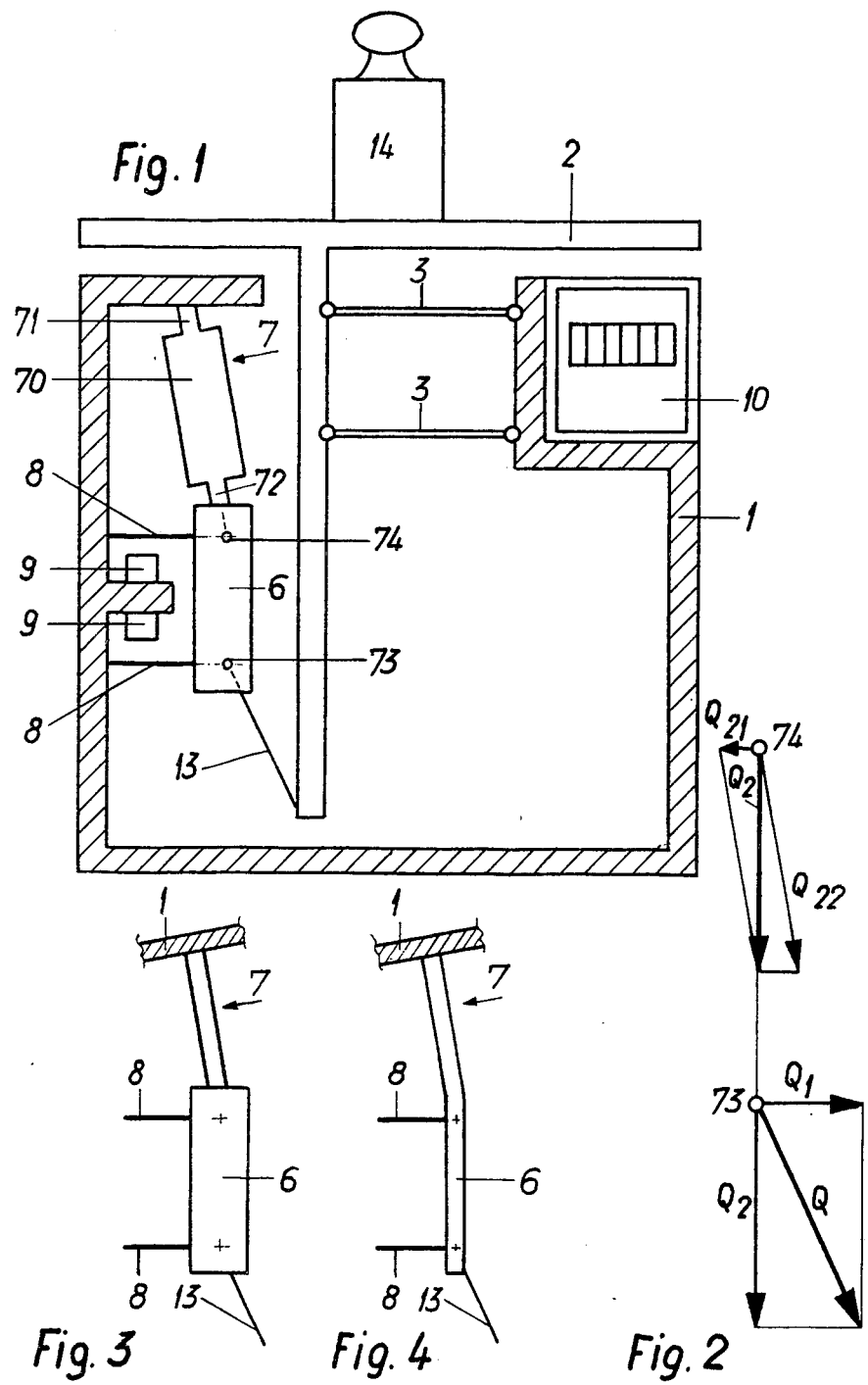

MASS AND FORCE METER

U.S. Pat. No. 4,075,887 (Application Ser. No. 648,326) relates to a mass and force meter with a frame, a load-support and a measuring system, wherein the mass or force to be measured acts indirectly on the tension of two transversally vibrating, pre-loaded strings excited by electronic means, so that the resultant frequency changes serve for calculating the magnitude of said mass or force in a computing device. Both strings, a first transmission element for the transmission of a pre-loading force and a second transmission element for the transmission of a force depending on the load to be measured are fixed to a force distributor. The force distributor is guided in a statically determined way relatively to the frame by means of the two strings and at least one guide with respect to the pre-loading force and to the force depending on the load to be measured.

The meters described in this patent are generally intended for shop, commercial and/or industrial applications. Their basic design meets demanding requirements, their manufacturing costs are correspondingly high. If meters of this type are to be used in other fields, i.e. as home appliance, the requirements will be partly different, but at any rate they will have to be cheaper.

It is an object of the invention to provide a mass and force meter comprising less parts than known meters and being therefore cheaper to manufacture. Under consideration of the application for which they are intended, they must provide the same quality as the known apparatuses. This can be achieved according to the invention in that said guide, which is fixed to the frame and to the force distributor, is elastic and under a bending pre-tension and can transmit moments, so that it generates the pre-load of the strings and transmits it to the force distributor.

An embodiment of the invention is shown schematically in the accompanying drawing:

FIG. 1 is an elevation view with partial cross-section of a meter used as a scale.

FIG. 2 is a scheme of the acting forces, and

FIGS. 3 and 4 show each a variant.

The meter shown in FIG. 1 is intended for use as a table scale. All parts shown are located substantially in the plane of the drawing.

The scale has a frame 1 to which a load support 2 is attached by means of guides 3, so that it is guided parallely to itself and vertically. Two vibrating strings 8 are mounted parallel to each other. They are fixed to frame 1 and to a force distributor 6. A guide 7 is fixed to force distributor 6 and to frame 1. A wire 13 connects load support 2 to force distributor 6. Exciting and pick-up heads 9 are provided next to strings 8 and are connected with a computing and display device 10 in which the magnitude of an unknown mass 14 is computed from the ratio of the frequencies of strings 8 and displayed.

Guide 7 comprises a body 70 and two elastic articulations 71, 72. It is fixed to frame 1 by means of articulation 71 and to force distributor 6 by means of articulation 72, so that these articulations can transmit forces and moments to force distributor 6.

In known meters both strings 8 are generally under a pre-load, preferably under the same pre-load. In the embodiment described, this pre-load is generated by a force exerted by force distributor 6 onto strings 8. The line of action of this force is horizontal, it is located halfway between strings 8, its direction is from left to right. This force corresponds to two forces of equal magnitude and of same direction acting each over one of the articulations 71, 72 and to two moments over these articulations. The magnitude and the distribution of the pre-load to both strings 8 can be determined by suitable choice of the rigidity and of the elastic bending of both articulations 71, 72. Guide 7 acts as transmission element for the pre-load as well as its generator.

Wire 13, which acts as transmission element for a force Q (FIG. 2) proportional to mass 14 to be measured, is mounted in an oblique position. Force Q is divided at point 73 into two components $Q_1$, $Q_2$. The first horizontal component $Q_1$ is directed toward the righthand side, it acts upon the lower string 8 and augments its tension. The second vertical component $Q_2$ is directed downwards and acts upon point 74, which is the intersection of the axis of the upper string 8 and of the symmetry axis of guide 7. This component $Q_2$ is divided itself into two components $Q_{21}$, $Q_{22}$. First component $Q_{21}$ is a horizontal force directed toward the righthand side, it relieves the tension of the upper string 8. The second component $Q_{22}$ is an oblique force directed downwards along the symmetry axis of guide 7. The magnitude and the distribution of additional or relief tensions to strings 8 due to the measuring force, i.e. to force Q corresponding to the magnitude of mass 14 to be measured, can be selected by suitable choice of the inclination of guide 7 and of wire 13.

The line of action of force $Q_{22}$ which is directed obliquely downwards corresponds to the axis of symmetry of guide 7 so that guide 7 acts as a pulling element with regard to this force. This is possible because force distributor 6 is guided in a statically determined way relatively to frame 1 by means of both strings 8 and guide 7 with respect to the pre-loading force and to the measuring force Q. Oblique force $Q_{22}$ does not generate any additional movement or deformation of guide 7. The length of articulations 71, 72 can be varied without change of the effects described above. If the radius of curvature of the elastic bendings remains unchanged, the angle between first and last tangents of each articulation 71, 72 being varied according to the length change, then the forces and the moments acting over articulations 71, 72 do not vary.

In FIG. 3 an embodiment of guide 7 is shown, according to which it consists of an elastic band, which is straight when in working position, i.e. when mounted. Such bands are manufactured so that in non-mounted state they are bent. FIG. 4 shows a further variant according to which both guide 7 and force distributor 6 are manufactured out of one single such band.

In the meter described the magnitude of the unknown mass is determined by means of a comparison of its weight with a known elastic force and not with the weight of a reference mass. As a consequence this reference mass and its guiding mechanism can be saved. These embodiments show how it is possible, with such meters, that the function of generating the pre-load and the function of transmitting it are taken over by a guide which has anyway to be present in the meter. Embodiment according to FIG. 4 shows that the guide and the force distributor can be produced from the same flat elastic band, so that further manufacturing costs can be saved.

We claim:

1. A mass and force meter comprising:
   a frame, a load support, an evaluation and display means mounted on said frame, a force distributor, first and second strings vibrating transversely when electrically excited, said strings being parallel to each other and each having one end fixed to the frame and the other end fixed to said force distributor, an elastic guide fixed to said frame and to said force distributor so as to be under bending pre-tension for transmitting moments to said force distributor, said guide generating thereby a pre-tensioning force transmitted by said force distributor to said first and second strings, a transmission element attached to said force distributor and support for transmitting to said first and second strings a force depending on the load placed on said support, means for applying to the evaluation and display means resultant frequency variations caused by the application of said forces to said strings for computation and display of the magnitude of said load, said guide and said strings guiding said force distributor in a statically defined way relative to said frame with respect to said pre-tensioning force and said force depending on the load to be measured.

2. A mass and force meter comprising:

a frame, a load support, an evaluation and display means mounted on said frame, a force distributor, first and second strings vibrating transversely when electrically excited, said strings being parallel to each other and each having one end fixed to the frame and the other end fixed to said force distributor, a guide consisting of a body and of two elastic articulations, one of said articulations being fixed to said frame, the other being fixed to said force distributor so as to be under bending pre-tension for transmitting moments to said force distributor, said guide generating thereby a pre-tensioning force transmitted by said force distributor to said first and second strings, a transmission element attached to said force distributor and support for transmitting to said first and second strings a force depending on the load placed on said support, means for applying to the evaluation and display means resultant frequency variations caused by the application of said forces to said strings for computation and display of the magnitude of said load, said guide and said strings guiding said force distributor in a statically defined way relative to said frame with respect to said pre-tensioning force and said force depending on the load to be measured.

3. A mass and force meter comprising:

a frame, a load support, an evaluation and display means mounted on said frame, a force distributor, first and second strings vibrating transversely when electrically excited, said strings being parallel to each other and having each one end fixed to the frame and the other end fixed to said force distributor, a guide consisting of an elastic band having one end fixed to said frame and the other end fixed to said force distributor, said band having a straight form when mounted in the meter, so as to be under bending pre-tension for transmitting moments to said force distributor, said guide generating thereby a pre-tensioning force transmitted by said force distributor to said first and second strings, a transmission element attached to said force distributor and support for transmitting to said first and second strings a force depending on the load placed on said support, means for applying to the evaluation and display means resultant frequency variations caused by the application of said forces to said strings for computation and display of the magnitude of said load, said guide and said strings guiding said force distributor in a statically defined way relative to said frame with respect to said pre-tensioning force and said force depending on the load to be measured.

4. A mass and force meter comprising:

a frame, a load support, an evaluation and display means mounted on said frame, a force distributor formed by a first elastic band having a straight form when mounted in the meter, first and second strings vibrating transversely when electrically excited, said strings being parallel to each other and each having one end fixed to the frame and the other end to said force distributor, a guide consisting of a second elastic band having one end fixed to said frame and the other end to said force distributor, said second band having a straight form when mounted in the meter, so as to be under bending pre-tension for transmitting moments to said force distributor, said guide generating thereby a pre-tensioning force transmitted by said force distributor to said first and second strings, said first and second elastic bands being constructed as one piece, a transmission element attached to said force distributor and support for transmitting to said first and second strings a force depending on the load placed on said meter, means for applying to the evaluation and display means resultant frequency variations caused by the application of said forces to said strings for computation and display of the magnitude of said load, said guide and said strings guiding said force distributor in a statically defined way relative to said frame with respect to said pre-tensioning force and said force depending on the load to be measured.

* * * * *